(12) United States Patent
Brown et al.

(10) Patent No.: US 10,704,173 B2
(45) Date of Patent: Jul. 7, 2020

(54) PROCESS FOR FORMING A HIGH LOFT, NONWOVEN WEB EXHIBITING EXCELLENT RECOVERY

(71) Applicant: Biax-Fiberfilm Corporation, Greenville, WI (US)

(72) Inventors: Douglas B Brown, Fremont, WI (US); Jeffrey D Stark, Neenah, WI (US); Mohammad A. Hassan, Johnson City, TN (US)

(73) Assignee: Biax-Fiberfilm Corporation, Greenville, WI (US)

( * ) Notice: Subject to any disclaimer, the term of this patent is extended or adjusted under 35 U.S.C. 154(b) by 373 days.

(21) Appl. No.: 15/428,265

(22) Filed: Feb. 9, 2017

(65) Prior Publication Data

US 2017/0211216 A1    Jul. 27, 2017

Related U.S. Application Data

(63) Continuation-in-part of application No. 14/167,488, filed on Jan. 29, 2014, now abandoned.

(51) Int. Cl.
*D04H 1/559* (2012.01)
*D04H 1/56* (2006.01)
(Continued)

(52) U.S. Cl.
CPC ......... *D04H 1/559* (2013.01); *B29C 48/0021* (2019.02); *B29C 48/05* (2019.02);
(Continued)

(58) Field of Classification Search
CPC .................................................. D04H 1/407; D04H 1/74; D04H 3/16; D04H 1/559; D04H 3/02; D04H 1/56;
(Continued)

(56) References Cited

U.S. PATENT DOCUMENTS

| | | |
|---|---|---|
| 3,529,045 A | 9/1970 | Rosenstein |
| 3,740,302 A | 6/1973 | Soehngen |

(Continued)

FOREIGN PATENT DOCUMENTS

| | | |
|---|---|---|
| CA | 1160010 | 1/1984 |
| DE | 1785712 | 7/1976 |

(Continued)

OTHER PUBLICATIONS

Mohammad Abouelreesh Hassan; Advances in Spun-Blown Fiber Technology and its Applications; ResearchGate; Jan. 2015; 26 pages.

(Continued)

*Primary Examiner* — Vishal I Patel
(74) *Attorney, Agent, or Firm* — Boyle Fredrickson, S.C.

(57) ABSTRACT

A process for forming a high loft, nonwoven web is disclosed. The process includes introducing a single molten polymer to a die having a plurality of nozzles. Emitting the molten polymer through the nozzles to form a plurality of filaments. Using air streams to facilitate movement and drawing of the filaments. Directing the filaments, which are transformed into fibers, towards a pair of heated moving surfaces. The pair of heated moving surfaces forming a convergent passage having an entry and an exit. Depositing the fibers into the entry of the convergent passage and routing the fibers between the pair of heated moving surfaces in a machine direction to form a high loft, non-woven web. The web having a fiber size distribution of from 0 μm to about 15 μm with at least about 25% of the fibers being above 4 μm.

15 Claims, 4 Drawing Sheets

(51) Int. Cl.

| | | |
|---|---|---|
| *D04H 3/02* | (2006.01) | |
| *D01D 5/26* | (2006.01) | |
| *B29C 48/05* | (2019.01) | |
| *B29C 48/00* | (2019.01) | |
| *D04H 1/74* | (2006.01) | |
| *D04H 3/16* | (2006.01) | |
| *D04H 1/407* | (2012.01) | |
| *B29L 7/00* | (2006.01) | |

(52) U.S. Cl.
CPC ............... *D01D 5/26* (2013.01); *D04H 1/407* (2013.01); *D04H 1/56* (2013.01); *D04H 1/74* (2013.01); *D04H 3/02* (2013.01); *D04H 3/16* (2013.01); *B29L 2007/008* (2013.01)

(58) Field of Classification Search
CPC ...... B29C 48/0021; B29C 48/05; D01D 5/26; B29L 2007/008
See application file for complete search history.

(56) References Cited

U.S. PATENT DOCUMENTS

| | | | |
|---|---|---|---|
| 4,375,466 A | | 3/1983 | Fujii et al. |
| 4,573,988 A | | 3/1986 | Pieniak et al. |
| 4,724,114 A | | 2/1988 | McFarland et al. |
| 4,724,144 A | | 2/1988 | McFarland et al. |
| 4,886,697 A | * | 12/1989 | Perdelwitz, Jr. ..... A47C 27/005 428/192 |
| 4,923,454 A | | 5/1990 | Seymour et al. |
| 5,324,576 A | | 6/1994 | Reed et al. |
| 5,350,370 A | | 9/1994 | Jackson et al. |
| 5,476,616 A | | 12/1995 | Schwarz |
| 5,773,375 A | | 6/1998 | Swan et al. |
| 6,232,521 B1 | | 5/2001 | Bewick-Sonntag et al. |
| 6,364,647 B1 | | 4/2002 | Sanborn |
| 6,776,952 B2 | | 8/2004 | Smith |
| 6,998,164 B2 | | 2/2006 | Neely et al. |
| 7,476,632 B2 | * | 1/2009 | Olson ..................... D04H 3/02 442/334 |
| 7,530,147 B2 | | 5/2009 | Noelle et al. |
| 8,017,534 B2 | | 9/2011 | Harvey et al. |
| 8,303,888 B2 | | 11/2012 | Brown et al. |
| 2001/0009711 A1 | | 7/2001 | Latimer et al. |
| 2003/0200991 A1 | | 10/2003 | Keck et al. |
| 2003/0213109 A1 | | 11/2003 | Neely et al. |
| 2004/0077247 A1 | | 4/2004 | Schmidt et al. |
| 2004/0097155 A1 | | 5/2004 | Olson et al. |
| 2004/0121686 A1 | | 6/2004 | Wong et al. |
| 2004/0224136 A1 | | 11/2004 | Collier, IV et al. |
| 2005/0056956 A1 | | 3/2005 | Zhao et al. |
| 2005/0098256 A1 | | 5/2005 | Polanco et al. |
| 2005/0244619 A1 | | 11/2005 | Kauschke et al. |
| 2006/0000070 A1 | | 1/2006 | Moonshammer |
| 2006/0063458 A1 | | 3/2006 | McGuire |
| 2007/0026753 A1 | | 2/2007 | Neely et al. |
| 2008/0038976 A1 | | 2/2008 | Berrigan et al. |
| 2008/0070465 A1 | | 3/2008 | Wiles |
| 2008/0318024 A1 | | 12/2008 | Angadjivand et al. |
| 2009/0142979 A1 | | 6/2009 | Farmer |
| 2009/0233049 A1 | | 9/2009 | Jackson et al. |
| 2009/0312731 A1 | | 12/2009 | Steindl et al. |
| 2010/0222755 A1 | | 9/2010 | Westwood |
| 2011/0045261 A1 | | 2/2011 | Sellars |
| 2012/0066855 A1 | | 3/2012 | Schmidt et al. |
| 2012/0171913 A1 | | 7/2012 | Fox et al. |
| 2012/0302982 A1 | | 11/2012 | Takebe et al. |
| 2013/0122773 A1 | * | 5/2013 | Wahal ..................... B29C 48/30 442/400 |
| 2015/0211159 A1 | | 7/2015 | Hassan et al. |

FOREIGN PATENT DOCUMENTS

| | | | | |
|---|---|---|---|---|
| DE | 10029127 A1 | | 5/2001 | |
| EP | 1469105 | | 10/2004 | |
| JP | 2009221618 A | | 10/2009 | |
| WO | 0066824 | | 11/2000 | |
| WO | WO-0066824 A1 | * | 11/2000 | ........... A61F 13/537 |
| WO | 2004046443 A1 | | 6/2004 | |
| WO | 2015000657 A1 | | 1/2015 | |

OTHER PUBLICATIONS

International Search Report from ISA for PCT/US2018/014739; date of completion Mar. 2, 2018; dated Mar. 14, 2018; 4 pages.
Written Opinion of ISA for PCT/US2018/014739; date of completion Mar. 2, 2018; dated Mar. 14, 2018; 5 pages.

* cited by examiner

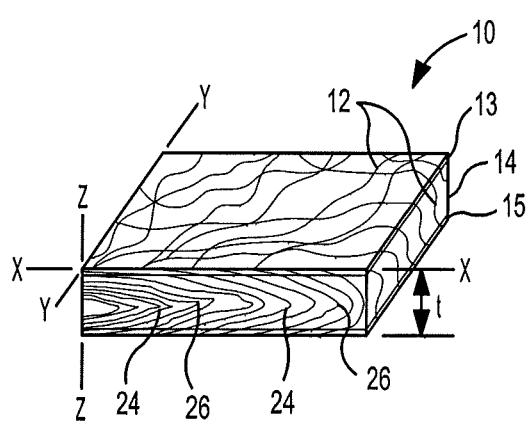
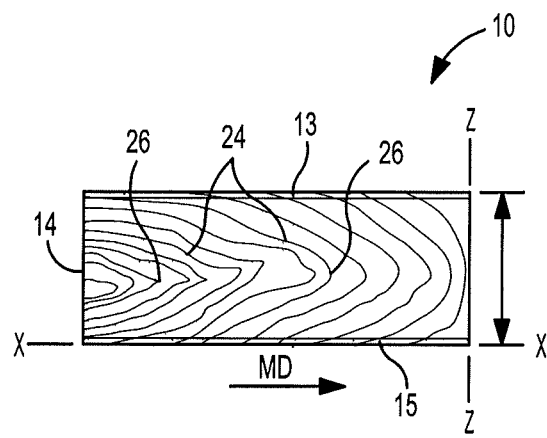
FIG. 1   FIG. 2
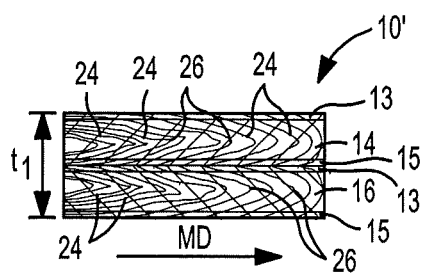
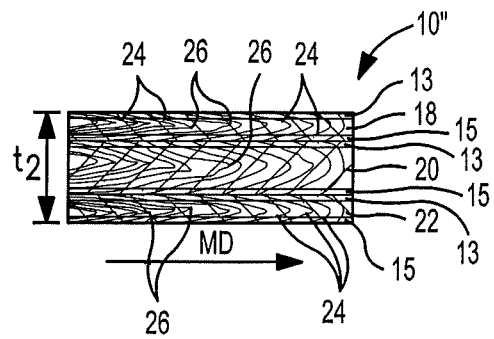
FIG. 3   FIG. 4
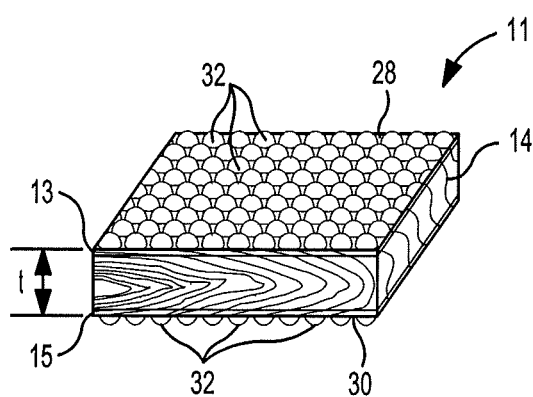
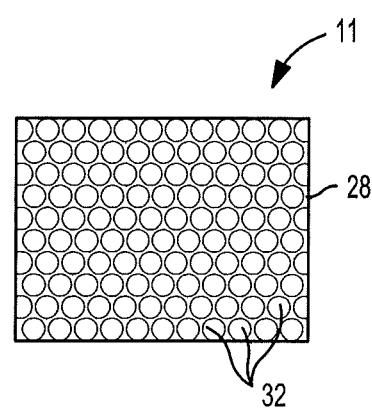
FIG. 5   FIG. 6

PROCESS FOR FORMING A HIGH LOFT, NONWOVEN WEB EXHIBITING EXCELLENT RECOVERY

CROSS-REFERENCE TO RELATED APPLICATION

This application is a Continuation-In-Part of non-provisional application Ser. No. 14/167,488, filed Jan. 29, 2014, which is incorporated herein by reference in its entirety.

FIELD OF THE INVENTION

This invention relates to a process forming a high loft, non-woven web exhibiting excellent recovery, especially a web formed from a single polymer and using a single "Spun-Blown®" die.

BACKGROUND OF THE INVENTION

Typically, polymeric fibers, formed by spunbonding, meltblowing or by some other extrusion process are collected downstream from an emitter, such as a die with a plurality of nozzles, on a horizontal oriented conveyor belt. Such processes tends to produce two-dimensional web where the fibers are oriented in the x and y directions since they are laid down in a horizontal plane. There are few if any fibers within the formed web that are oriented in the z-direction. Because of this, the finished web tends to lack recovery once it is compressed. This presents an issue when such finished webs need to be rolled up or stacked for transport by truck or rail to a distance manufacturing facility. If the webs are compacted or compressed during shipment, they lack the ability to recovery to their original thickness. In addition, once compacted or compressed, such webs tend to become hard and/or stiff and their pore structure may become less open. Furthermore, the drapeability of such webs can be diminished. Functionally, if a compacted or compressed web cannot recovery to approximately its initial loft thickness after shipment, it can lose some of its thermal and/or acoustical insulation properties, thereby rendering the material less than desirable for this purpose.

Now, a process for forming a high loft, non-woven web has been invented which exhibits excellent recovery. The high loft, non-woven web can be formed from a single polymer and using a single "Spun-Blown®" die.

SUMMARY OF THE INVENTION

Briefly, this invention relates to a process for making a high loft, non-woven web exhibiting excellent recovery.

The high loft, non-woven web is a 3-dimensional structure with fibers oriented in the x, y and z directions. The high loft, non-woven web can be constructed as a single layer or can be formed with two or more layers. The high loft, non-woven web has a fiber size distribution of from 0 µm to about 15 µm with at least about 25% of the fibers being above 4 µm. The high loft, non-woven web has a thickness of less than about 250 millimeters and a basis weight of from between about 20 $g/m^2$ to about 3,000 $g/m^2$. The high loft, non-woven web can be additionally bonded using a thermal bonder, a chemical bonder, a hydro-mechanical bonder, a mechanical bonder, or be left unbonded. A vertical cross-section of the web, when taken parallel to its machine direction, exhibits two thin outer skins, each having a thickness of less than about 2.5 millimeters, with a plurality of snugly stacked, approximately V, U, or C-shaped structures formed therebetween. Each of the approximately V, U, or C-shaped shaped structure has an apex facing in the machine direction. The high loft, non-woven web has a recovery value of from between about 20% to about 99% after being compressed under a pressure of 0.25 psi for a time period of 30 minutes.

An apparatus for producing a high loft, non-woven web has a 3-dimensional structure with fibers oriented in the x, y and z directions. The apparatus includes a die having 2 to 20 rows of nozzles, with each row having a plurality of nozzles each emitting a filament, and each of the plurality of nozzles having a distal end. By "plurality of nozzles" it is meant 3 or more nozzles. A pair of moving surfaces is located from between about 10 cm to about 150 cm of the distal end of each of the plurality of nozzles. A pair of heaters is also present with each heater being associated with one of the pair of moving surfaces. The pair of heaters is capable of heating the pair of moving surfaces to an elevated temperature below the melting temperature of the polymer. The pair of moving surfaces forms a convergent passage having an entry and an exit. The apparatus also includes a mechanism for depositing the plurality of filaments onto and between the pair of heated moving surfaces. The plurality of filaments is routed through the convergent passage in descending travel from the entry to the exit to form a 3-dimensional structure. The apparatus can further include a bonder located downstream of and in vertically alignment with the pair of moving surfaces for bonding the 3-dimensional structure to create a high loft, non-woven web with the filaments transformed into fibers oriented in the x, y and z directions. The web has a thickness of less than about 250 mm and a basis weight ranging from between about 20 $g/m^2$ to about 3,000 $g/m^2$. A vertical cross-section of the high loft, non-woven web, when taken parallel to its machine direction, exhibits two thin outer skins with a plurality of snugly stacked, approximately V, U, or C-shaped structures formed therebetween. Each of the outer skins is less than about 2.5 millimeters in thickness. Each of the approximately V, U, or C-shaped structure has an apex facing in the machine direction. The high loft, non-woven web has a recovery value ranging from between about 20% to about 99% after being compressed under a pressure of 0.25 psi for a time period of 30 minutes. The high loft, non-woven web also has a wide fiber size distribution with the larger fibers providing the unique recovery value.

A process for forming a high loft, non-woven web is also taught which has a 3-dimensional structure with fibers oriented in the x, y and z directions. The process includes the steps of introducing a single molten polymer to a die having 2 to 20 rows of nozzles with each row containing a plurality of nozzles. The single molten polymer is emitted, ejected or extruded through the plurality of nozzles to form a plurality of filaments. Air or gas streams are then used to facilitate downward movement of the plurality of filaments. The plurality of filaments, which are transformed into a plurality of fibers, are directed towards a pair of moving surfaces located at a distance of from between about 10 cm to about 150 cm from the plurality of nozzles. A pair of heaters is also present with each heater being associated with one of the pair of moving surfaces. The pair of heaters is capable of heating the pair of moving surfaces to an elevated temperature. The elevated temperature can be below the melting temperature of the polymer. The pair of heated moving surfaces forms a convergent passage having an entry and an exit. The plurality of fibers is deposited into the entry of the convergent passage. The plurality of fibers is then routed through the convergent passage in descending travel from the entry to the exit and between the pair of heated moving surfaces in a machine direction to form a 3-dimensional structure with the fibers oriented in the x, y and z directions. The high loft, non-woven web has a fiber size distribution of from 0 µm to about 15 µm with at least about 25% of the fibers being above 4 µm. The web also has a thickness of less than about 250 millimeters and a basis weight ranging from between about 20 g/m² to about 3,000 g/m². A vertical cross-section of the high loft, non-woven web, when taken parallel to its machine direction, exhibits two thin outer skins, each having a thickness of less than about 2.5 millimeters, with a plurality of snugly stacked, approximately V, U, or C-shaped structures formed therebetween. Each of the approximately V, U, or C-shaped structure having an apex facing in the machine direction. The high loft, non-woven web has a recovery value ranging from between about 20% to about 99% after being compressed under a pressure of 0.25 psi for a time period of 30 minutes. The high loft, non-woven web also has a wide fiber size distribution with the larger fibers providing the unique recovery value.

The general object of this invention is to provide a process for forming a high loft, nonwoven web exhibiting excellent recovery. A more specific object of this invention is to provide a process for forming a high loft, nonwoven web with good thermal insulation and/or acoustical insulation values.

Another object of this invention is to provide a process for forming a high loft, nonwoven web which can be used in the bedding, upholstery, filtration, foam replacement materials, and products utilizing cushioning materials.

A further object of this invention is to provide a process for forming a high loft, nonwoven web exhibiting from between about 30% to about 98% recovery after compression, and such web exhibits a high porosity.

Still another object of this invention is to provide a process for forming a high loft, nonwoven web exhibiting excellent recovery such that it can be compactly shipped without losing any material properties.

Still further, an object of this invention is to provide a process for forming a high loft, nonwoven web exhibiting from between about 40% to about 97% recovery after compression.

Other objects and advantages of the present invention will become more apparent to those skilled in the art in view of the following description and the accompanying drawings.

BRIEF DESCRIPTION OF THE DRAWINGS

FIG. 1 is a perspective view of a high loft, non-woven web of this invention showing a plurality of snugly stacked, approximate V, U or C-shaped structures, with each uniquely shaped structure having an apex facing in the machine direction of the web.

FIG. 2 is a schematic of a vertical cross-section of a section of a high loft, non-woven web showing a plurality of snugly stacked, approximate V, U or C-shaped structures, with each uniquely shaped structure having an apex facing in the machine direction of the web.

FIG. 3 is a cross-sectional view of a two layer web.

FIG. 4 is a cross-sectional view of a multi-layer web.

FIG. 5 is a perspective view of an alternative embodiment of a high loft, non-woven web depicting textured upper and lower surfaces FIG. 6 is a schematic of the textured upper surface of the high loft, non-woven web shown in FIG. 5.

DETAILED DESCRIPTION OF THE INVENTION

Figure 7:
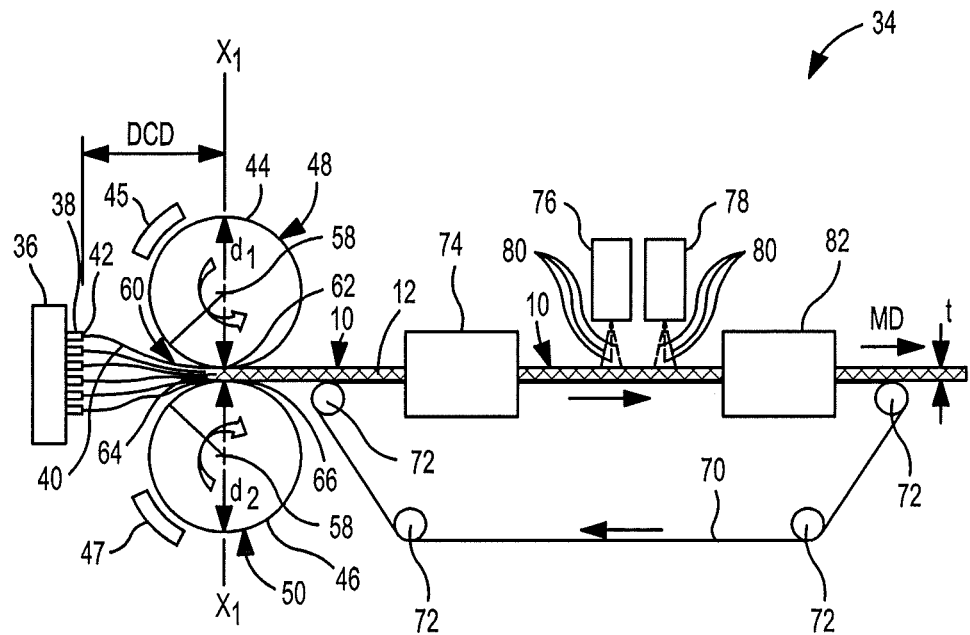
FIG. 7 is a schematic of an apparatus utilizing a pair of rotatable drums located immediately downstream of a die.

Referring to FIGS. 1 and 2, a high loft, non-woven web 10 is shown. The high loft, non-woven web 10 can be formed from a single polymer. A good polymer to use is polypropylene. Alternatively, the high loft, non-woven web 10 can contain two or more layers with each layer formed from a single polymer. The high loft, non-woven web 10 is a 3-dimensional structure with a plurality of fibers 12 oriented in the x, y and z directions. In FIG. 1, X--X represents the longitudinal central axis, Y--Y represents the vertical central axis, and Z--Z represents the transverse central axis. By 'web" it is meant a fabric or material manufactured in sheet form. By "high loft" it is meant a low density, fibrous web characterized by a high ratio of thickness to weight per unit area. The fibers in the web 10 may be continuous, bonded or unbounded. Desirably, the fibers 12 are continuous and some of the fibers 12 are bonded. A high loft, non-woven web has from between about 2% to about 50% solids by volume. By "non-woven" it is meant a web, sheet or batt of natural and/or man-made fibers or filaments (excluding paper) that have not been converted into yarns, and that are bonded to each other by thermal, chemical, mechanical, hydro-mechanical, or by some other means known to those skilled in the art.

The high loft, non-woven web 10 can contain a single polymer formed from a variety of materials. The high loft, non-woven web 10 can be formed from man-made fibers. Typically, the high loft, non-woven web 10 is formed from a polymer. The polymer can be selected from the group consisting of: polyolefins, polyesters, polyethylene terephthalates, polybutylene terephthalates, polycyclohexylene dimethylene terephthalates, polytrimethylene terephthalates, polymethyl methacrylates, polyamides, nylons, polyacrylics, polystyrenes, polyvinyls, polytetrafluoroethylenes, ultrahigh molecular weight polyethylenes, very high molecular weight polyethylenes, high molecular weight polyethylenes, polyether ether ketones, non-fibrous plasticized celluloses, polyethylenes, polypropylenes, polybutylenes, polymethylpentenes, low-density polyethylenes, linear low-density polyethylenes, high-density polyethylenes, polystyrenes, acrylonitrile-butadiene-styrenes, styrene-acrylonitriles, styrene-butadienes, styrene-maleic anhydrides, ethylene vinyl acetates, ethylene vinyl alcohols, polyvinyl chlorides, cellulose acetates, cellulose acetate butyrates, plasticized cellulosics, cellulose propionates, ethyl celluloses, natural fibers, any derivative thereof, any polymer blend thereof, any copolymer thereof or any combination thereof. Desirably, the high loft, non-woven web 10 is formed from polypropylene fibers. More desirably, the high loft, non-woven web 10 is formed solely from polypropylene fibers. Even more desirably, the high loft, non-woven web 10 is formed from 100% polypropylene fibers. Most desirably, the high loft, non-woven web 10 is formed from Biax's spun-blown® polypropylene fibers. The word "spun-blown" is a registered trademark of Biax-Fiberfilm Corporation having an office at N1001 Tower View Drive, Greenville, Wis. 54942.

Those skilled in the chemical arts may know of other polymers that can also be used to form the high loft, non-woven web 10. It should be understood that the high loft, non-woven web 10 is not limited to just those polymers identified above.

It should be noted that up until now, most fibrous non-woven webs required staple fibers and/or crimp fibers in order to have a significant recovery. U.S. Pat. No. 7,476,632 B2, issued Jan. 13, 2009, to Olson et al. is one example of a fibrous non-woven web which requires staple fibers in order to exhibit loft and recovery. The present invention does not use any staple fibers or secondary fibers.

The high loft, non-woven web 10 can be formed or manufactured using many different kinds and types of equipment and processes. Some commonly known technology which can be used to form the high loft, non-woven web 10 include, but are not limited to spinning processes such as: meltblowing, spunbond, spunmelt, solution blowing, electrospinning. However, these other processes do not provide the desired wide fiber size distribution useful in the recovery with good acoustical properties all out of a single die, as the Spun-blown® die exhibits.

By "spunbond" it is meant a process for producing a strong, fibrous non-woven webs directly from thermoplastic polymers by attenuating the spun filaments using low temperature, high speed air, while quenching the fibers near the spinnerette face. Individual fibers are then laid down randomly on a collection belt and are then conveyed to a bonder. The bonder gives the web strength and integrity. Fiber size is usually below 250 μm, the average fiber size is in the range of from between about 10 microns to about 50 microns, and the fibers are very strong compared to meltblown fibers because of the molecular chain alignment that is achieved during the attenuating of the crystallized (solidified) filaments. A typical spunbond die has multiple rows of polymer nozzle holes. A typical melt flow rate is below about 500 grams/10 minutes.

By "spunmelt" it is meant a process where fibers are spun from molten polymers through a plurality of nozzles located in a die head connected to one or more extruders. A spunmelt process may include meltblowing and/or spunbonding.

By "meltblowing" it is meant a process where a plurality of molten polymer streams are attenuated using an elevated temperature, high speed gas stream. The gas can be air or a gas known to those skilled in the art. The attenuated fibers are then collected on a movable belt, conveyor or a dual drum collector. Typically, a meltblowing die has around 35 nozzles per inch, a row of spinnerettes and two inclined air or gas jets for attenuating the fiber streams. U.S. Pat. No. 4,380,570 and WO 2005/106,085 A1 teach meltblowing processes where multiple rows of polymer nozzles are surrounded by air nozzles and the streams flowing therefrom are aligned parallel to one another.

Still referring to FIGS. 1 and 2, the high loft, non-woven web 10 can be constructed as a single layer 14 of material. The high loft, non-woven web 10 can be formed using equipment where air or gas is used to facilitate movement and drawing of the molten polymer through 2 to 20 rows of nozzles. Each row contains a plurality of nozzles with each nozzle ejecting, emitting or extruding a filament. Desirably, the filaments are formed from a single polymer. By "plurality of nozzles" it is meant 3 or more nozzles. The non-woven web 10 has two thin outer skins 13 and 15. Each of the two thin outer skins 13 and 15 can vary in dimension. Desirably, each of the two thin outer skins 13 and 15 are less than about 2.5 millimeters (mm) in thickness. More desirably, each of the two thin outer skins 13 and 15 ranges from between about 0.25 mm to about 2.5 mm.

The two thin outer skins 13 and 15 function to retain the approximately V, U, or C-shaped fibrous structure therebetween. The V, U, or C-shaped fibers provide the recovery feature of this invention since they act as springs and can return to or near their original position after being squeezed or compressed. The V, U, or C-shaped fibers are not bonded like the fibers which form the two thin outer skins 13 and 15.

The two thin outer skins 13 and 15 are formed as the polymer contacts the heated moving surfaces, as will be explained in more detail below. The two thin outer skins 13 and 15 eliminate the need to further form or attach an outer skin to the non-woven web 10 to provide for abrasion resistance and or acoustical enhancements. In addition, the V, U, or C-shaped fibers, located between the two thin outer skins 13 and 15, exhibit a wide fiber size distribution wherein the thicker fibers act as the springs to provide recovery, while the finer fibers provide the non-woven web 10 with superior sound absorbing properties. The finer fibers (percentage wise) are concentrated in the middle or center of the non-woven web 10. Desirably, at least about 50% of the fine fibers are located in the middle of the non-woven web 10. More desirably, at least about 55% of the fine fibers are located in the middle of the non-woven web 10. Even more desirably, at least about 60% of the fine fibers are located in the middle of the non-woven web 10. Most desirably, at least about 65% of the fine fibers are located in the middle of the non-woven web 10.

Referring to FIGS. 3 and 4, two different high loft, non-woven webs 10' and 10" are shown. In FIG. 3, the high loft, non-woven web 10' is formed with two separate and distinct layers, 14 and 16. Each layer 14 and 16 has its own two outer skins 13 and 15. In FIG. 4, the web 10" is formed with three separate and distinct layers 18, 20 and 22. Each of the three layers 18, 20 and 22 has its own two outer skins 13 and 15. The web 10" contains multiple layers. By "multiple layers" it is meant 3, 4, 5, 6, 7 or more separate and distinct layers. Some of the layers can be similar and/or identical in composition and characteristics to another layer, while one or more layers can vary in composition and/or characteristics from one or more of the remaining layers. It should be understood that the web 10 consisting of a single layer 14, the web 10' consisting of two layers 14 and 16, or the web 10" consisting of three layers 18, 20 and 22, can be additionally bonded to provide additional strength and integrity.

In FIG. 3, the web 10' is a two layer embodiment having an upper layer 14 and a lower layer 16. In FIG. 4, the web 10" is a three layer embodiment having an upper layer 18, a middle layer 20 and a lower layer 22. When two or more layers are present in the finished non-woven web 10' or 10", it should be understood that each layer can vary in the type of polymer it is made from. In addition, the characteristics of a given layer can vary. For example, the characteristics of one layer can be different from another layer. The thickness of each layer in the web 10" can also vary. The layers can be of the same thickness or one or more of the layers can be of a different thickness. The density of each layer in the web 10" can also vary or be the same. The basis weight of each layer in the web 10" can also vary or be the same.

Referring again to FIGS. 1 and 2, the high loft, non-woven web 10 is depicted as a single layer structure formed from a single polymer. The high loft, non-woven web 10 has a thickness t which can vary in dimensions. Generally, the thickness t of the high loft, non-woven web 10 can range from between about 5 millimeters (mm) to about 300 mm. Desirably, the thickness t of the high loft, non-woven web is less than about 250 millimeters. More desirably, the thickness t of the high loft, non-woven web 10 is less than about 200 mm. Even more desirably, the thickness t of the high loft, non-woven web 10 is less than about 100 mm. Most desirably, the thickness t of the high loft, non-woven web 10 is less than about 50 mm. When two or more layers are present in the finished web 10' or 10", the overall thickness of the web 10' or 10" can double, triple, etc. depending upon how many layers are present.

The high loft, non-woven web 10 can be formed with different basis weights. Generally, the basis weight of the high loft, non-woven web 10 ranges from between about 20 grams per square meter (g/m$^2$) to about 3,000 g/m$^2$. Desirably, the basis weight of the high loft, non-woven web 10 ranges from between about 30 grams per square meter (g/m$^2$) to about 2,000 g/m$^2$. More desirably, the basis weight of the high loft, non-woven web 10 ranges from between about 40 grams per square meter (g/m$^2$) to about 1,000 g/m$^2$. Even more desirably, the basis weight of the high loft, non-woven web 10 is less than about 600 g/m$^2$. Most desirably, the non-woven web 10 will have a basis weight of from between about 20 to about 600 grams per square meter.

The high loft, non-woven web 10 can also vary in density. Generally, the high loft, non-woven web 10 has a density ranging from between about 2 kilograms per cubic meters (kg/m$^3$) to about 100 kg/m$^3$. Desirably, the high loft, non-woven web 10 has a density ranging from between about 4 kg/m$^3$ to about 90 kg/m$^3$. More desirably, the high loft, non-woven web 10 has a density ranging from between about 5 kg/m$^3$ to about 70 kg/m$^3$. Even more desirably, the high loft, non-woven web 10 has a density ranging from between about 6 kg/m$^3$ to about 50 kg/m$^3$.

Furthermore, the high loft, non-woven web 10 can be formed from polypropylene having a melt flow rate ranging from between about 4 g/10 min. to about 6,000 g/10 min at a temperature of 230° C. and at a pressure of 2.16 kg according to the teachings of ASTM D 1238 testing method. Desirably, the high loft, non-woven web 10 can be formed from polypropylene having a melt flow rate ranging from between about 10 g/10 min. to about 2,500 g/10 min at a temperature of 230° C. and at a pressure of 2.16 kg. More desirably, the high loft, non-woven web 10 can be formed from polypropylene having a melt flow rate ranging from between about 20 g/10 min. to about 1,000 g/10 min at a temperature of 230° C. and at a pressure of 2.16 kg. Most desirably, the high loft, non-woven web 10 can be formed from polypropylene having a melt flow rate ranging from between about 35 g/10 min. to about 800 g/10 min at a temperature of 230° C. and ata pressure of 2.16 kg.

Referring again to FIG. 2, the schematic clearly shows a vertical cross-section of the high loft, non-woven web 10 taken parallel to the machine direction (MD). During formation of the high loft, non-woven web 10, the material advances from left to right. The leading edge of the high loft, non-woven web 10 is to the right. The high loft, non-woven web 10 exhibits a plurality of snugly stacked, approximately V, U or C-shaped structures 24. These V, U or C-shaped structures 24 are also depicted in FIG. 1. Each of the approximately V, U or C-shaped structures 24 has an apex 26 which faces in the machine direction (MD). In other words, the approximately V or U shaped structure is rotated 90 degrees to a horizontal orientation with the apex of each facing to the right. The C-shaped structure is reversed in position so that the apex of each faces to the right. This unique structure occurs because of the way the fibers 12 are laid down during formation. This unique structure is important for it gives the high loft, non-woven web 10 a very high recovery value. The high loft, non-woven web 10 has a recovery value ranging from between about 20% to about 99% after being compressed under a pressure of 0.25 psi for a time period of 30 minutes, according to the guidelines of the INDA Standard Test Method (IST 120.3 (95)). Desirably, the high loft, non-woven web 10 has a recovery value ranging from between about 30% to about 98% according to the guidelines of the IST 120.3 (95). More desirably, the high loft, non-woven web 10 has a recovery value ranging from between about 40% to about 97% according to the guidelines of the IST 120.3 (95). Even more desirably, the high loft, non-woven web 10 has a recovery value ranging from between about 50% to about 96% according to the guidelines of the IST 120.3 (95).

It should be understood that each of the two layers of the web 10', see FIG. 3, and each of the three layers of the web 10", see FIG. 4, also exhibits this plurality of snugly stacked, approximately V, U or C-shaped structures 24 if they are laminated offline, but they will show one snugly stacked structured, approximately V, U or C shaped structured, if they are comingled simultaneously from different spinning heads. This kind of comingled high loft structure could have different fiber size, different polymeric materials, and/or different fiber cross-section.

Referring again to FIG. 3, the two layered web 10' has a 3-dimensional structure with fibers oriented in the x, y and z directions. This two layer web 10' has a thickness $t_1$ of from between about 5 millimeters to about 500 millimeters and a basis weight of from between about 20 g/m$^2$ to about 2,000 g/m$^2$. The two layered web 10' does not have to be bonded but desirably is thermally or chemically bonded. Alternatively, the web 10' could be mechanically or hydro-mechanically bonded. The two layers 14 and 16 can be of the same thickness or have a different thickness. Each of the two layers, 14 and 16, exhibits a vertical cross-section, when taken parallel to the machine direction (MD) during manufacture of the two layered web 10', which exhibits a plurality of snugly stacked, approximately V, U or C-shaped structures 24. Each of the approximately V, U or C-shaped structures 24 has an apex 26 facing in the machine direction (MD).

The two layered web 10' has a recovery value of from between about 20% to about 99% after being compressed under a pressure of 0.25 psi for a time period of 30 minutes according to the guidelines of the IST 120.3 (95). Desirably, the two layered web 10' has a recovery value ranging from between about 30% to about 98% according to the guidelines of the IST 120.3 (95). More desirably, the two layered web 10' has a recovery value ranging from between about 40% to about 97% according to the guidelines of the IST 120.3 (95). Even more desirably, the two layered web 10' has a recovery value ranging from between about 50% to about 96% according to the guidelines of the IST 120.3 (95).

It should be understood that the two layer web 10' can be formed as two separate layers 14 and 16 from comingled fibrous materials where each layer has a different fiber size, is formed from a different material, has different fiber cross-sections, has a different thickness, etc. Furthermore, the two layered web 10' could be laminated to one or more layers. The additional layers could be a thermoplastic film, a film, another non-woven material, paper, cardboard, etc.

Referring again to FIG. 4, the three layered web 10" has a 3-dimensional structure with fibers oriented in the x, y and z directions. This three layer web 10" has a thickness $t_2$ of from between about 5 millimeters to about 750 millimeters and a basis weight of from between about 30 g/m$^2$ to about 2,000 g/m$^2$. The three layered web 10" does not have to be bonded but desirably is thermally or chemically bonded. Alternatively, the web 10" could be mechanically or hydro-mechanically bonded. The three layers 18, 20 and 22 can be of the same thickness or have a different thickness. Each of the three layers, 18, 20 and 22 exhibits a vertical cross-section, when taken parallel to the machine direction (MD) during manufacture of the web 10", which exhibits a plurality of snugly stacked, approximately V, U or C-shaped structures 24. Each of the approximately V, U or C-shaped structures 24 has an apex 26 facing in the machine direction (MD).

The three layered web 10" has a recovery value of from between about 20% to about 99% after being compressed under a pressure of 0.25 psi for a time period of 30 minutes according to IST 120.3 (95). Desirably, the three layered web 10 has a recovery value ranging from between about 30% to about 98% according to IST 120.3 (95). More desirably, the three layered web 10 has a recovery value ranging from between about 40% to about 97% according to IST 120.3 (95). Even more desirably, the three layered web 10 has a recovery value ranging from between about 50% to about 96% according to IST 120.3 (95).

It should also be recognized that an additive can be incorporated into the high loft, non-woven web 10, 10' or 10". The additive (not shown) can be applied to the high loft, non-woven web 10, 10' or 10" during manufacture. The additive can be applied in various ways, including but not limited to: being sprayed on, being sprinkled on, being extruded, being combined with, being painted on, being immersed, etc. The additive can be a gas, a liquid, a solid or a semi-solid. The additive can be selected from the group consisting of: a superabsorbent, absorbent particles, polymers, nanoparticles, abrasive particulars, active particles, active compounds, ion exchange resins, zeolites, softening agents, plasticizers, ceramic particles pigments, dyes, flavorants, aromas, controlled release vesicles, binders, adhesives, tackifiers, surface modification agents, lubricating agents, emulsifiers, vitamins, peroxides, antimicrobials, deodorizers, fire retardants, flame retardants, antifoaming agents, anti-static agents, biocides, antifungals, degradation agents, stabilizing agents, conductivity modifying agents, or any combination thereof.

Referring now to FIGS. 5 and 6, an alternative embodiment of high loft, non-woven web 11 is shown having been formed as a single layer 14 with two major surfaces, 28 and 30. The two major surfaces, 28 and 30, are aligned opposite to one another. In FIG. 5, the two major surfaces include an upper surface 28 and a lower surface 30. By "two major surfaces" it is meant the two surfaces 28 and 30 of the web 11 which have the greatest surface area. The web 11 has two major surfaces, 28 and 30, and both of these major surfaces 28 and 30 are textured. By "textured" it is meant a rough or grainy surface quality, as opposed to being smooth. The texture can be formed various ways during processing of the web 11. In FIG. 5, a plurality of protuberances 32 extends upward from the upper surface 28 and downward from the lower surface 30. By "protuberance" it is meant a bulge, knob or swelling that protrudes outward. Alternatively, indentations, cavities or depressions could be formed in the upper and/or lower surfaces, 28 and 30 respectively, to obtain a similar textured effect. Desirably, at least one of the two major surfaces, 28 and 30 of the web 11 is textured. More desirably, both of the two major surfaces, 28 and 30 of a web 11 are textured.

The two major surfaces, 28 and 30 can have a thickness as was explained above with reference to the outer skins 13 and 15.

Example 1

In this example, we were looking at the effect of spinning technology on web properties. Three (3) different non-woven webs were made using polypropylene resin. All three (3) had the same basis weight but each was spun using a different spinnerette design and different processing conditions. As shown in Table 1, sample S-1 was produced using a Biax multi-row spinnerette design that did not have air insulation inserts or an air shrouding curtain surrounding the periphery of the nozzles 38. Sample S-2 was produced using a conventional meltblown process which had only one line of nozzles along with inclined air jets. Sample S-3 was produced using the inventive process.

The sample S-3 achieved almost double the machine direction (MD) tensile strength as compared to sample S-1 or sample S-2. Also, one will notice that the fiber diameter of sample S-3 was slightly larger than the fiber diameter of the conventional meltblown sample S-2. The primary reason for this difference in diameter is that when using the inventive process, the colder air temperature in the annular channels is directed essentially parallel to the direction of flow of the filaments 40 in a multi-row fashion. In addition, by attenuating the fibers using colder gas (air) one can increase fiber crystallinity and align the molecular chains inside the solidified fibers. This feature facilitates attenuation of the filaments 40 into strong, fine fibers. In a conventional meltblown process, the attenuating air is introduced at a steep or inclined angle, using hot air jets.

Figure 9:
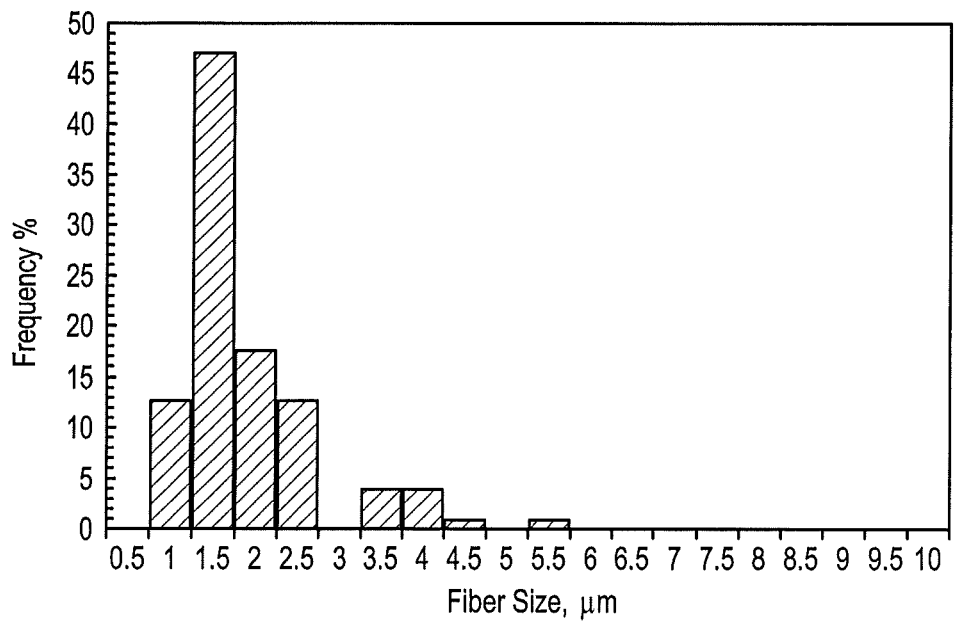
FIG. 9 is a pair of histograms comparing the difference in "Fiber Diameter Distribution" for a non-woven web produced according to this invention and one produced using a conventional meltblown process.
Figure 9:
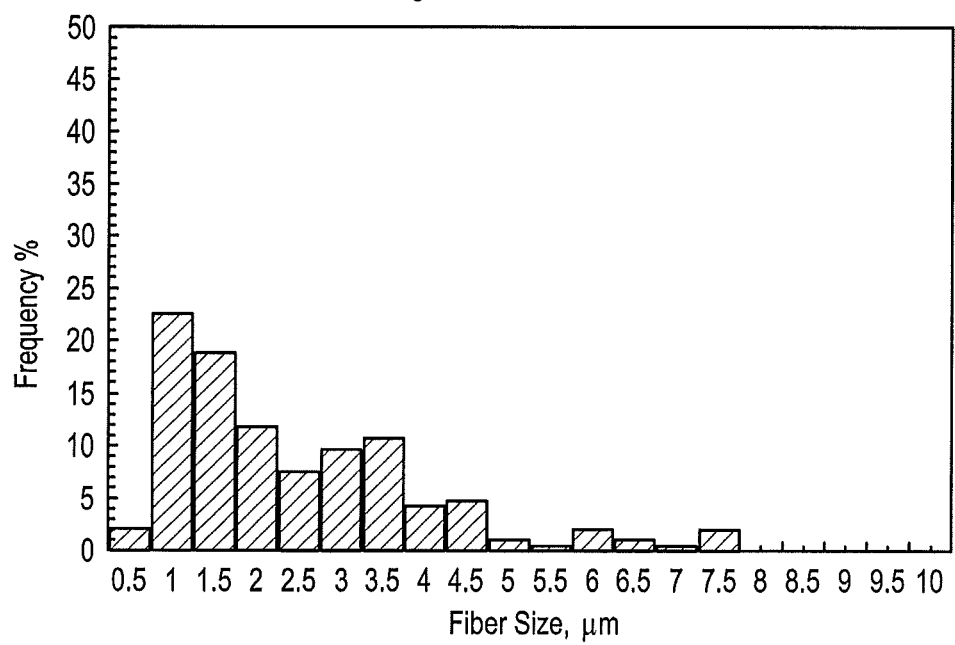

Referring now to FIG. 9, another interesting feature of the non-woven web 10, 10', 10" or 11 manufactured according to this invention is a wide "fiber size distribution". The fiber size distribution, shown in the lower graph of FIG. 9, ranges from between about 0 µm and about 15 µm. Desirably, the fiber size distribution ranges from 0 µm and about 8 µm. Our wide fiber size distribution includes fibers having a fiber size of from about 3 µm to about 7.5 µm. More desirably, our wide fiber size distribution includes fibers having a fiber size of from about 4 µm to about 7.5 µm. Furthermore, our wide fiber size distribution includes fibers having a fiber size of from about 5 µm to about 7.5 µm. Still further, our wide fiber size distribution includes fibers having a fiber size of from about 6 µm to about 7.5 µm.

The lower graph in FIG. 9 also shows that in our invention, at least about 25% of the fibers are above 4 µm. Desirably, at least about 20% of the fibers are above 4.5 µm. More desirably, at least about 15% of the fibers are above 5 µm. Still more desirably, at least about 10% of the fibers are above 5.5 µm. Most desirably, at least about 5% of the fibers are above 6 µm.

Still referring to the lower graph in FIG. 9, our wide fiber size distribution includes fibers having a major portion of their frequency of from about 0.5 µm to about 7.5 µm. Furthermore, our wide fiber size distribution includes fibers having a major portion of their frequency from about 1 µm to about 4.5 µm. More so, our wide fiber size distribution includes fibers having a major portion of their frequency from about 1 µm to about 4 µm. Even more pronounced, our wide fiber size distribution includes fibers having a frequency extending from about 0 µm to about 8 µm.

Webs formed from conventional meltblown processes have a "fiber size distribution", shown in the upper graph of FIG. 9, which range from between about 0.5 to about 6, and 85% are between 0.5 and 2.5. This would be considered a "tight" or normal fiber size distribution. When one compares our inventive "fiber size distribution" to the "fiber size distribution" of a non-woven web produced using a conventional meltblown process, it is very clear that the standard deviation values and the "fiber size distribution" are very different. The main reason for this wide "fiber size distribution" in our apparatus 34, 34' or 34" is the use of a multi-row spinnerette design. The spinnerette can utilize from 2 to 20 rows of nozzles 38. The filaments 40 exiting the nozzles 38, located within the periphery of multi-row spinnerette, are not exposed to the surrounding ambient air and a quick quench time, and therefore these filaments 40 tend to stay hotter longer and thereby produce finer fibers than the filaments 40 that are extruded from nozzles 38 located in the outside rows of a spinnerette body. By replacing the nozzles 38 with stationary pins (not shown) in the outside rows, located adjacent to the periphery, an air curtain or shroud can be formed around the plurality of extruded filaments. This air curtain or shroud delays the interaction of the surrounding ambient air with the extruded filaments 40. This delay prevents the early solidification of the molten polymer streams at the terminal tip of each nozzle 38 and reduces shots and roping defects that are encountered when the old Biax multi-row spinnerette was used. This earlier multi-row spinnerette is taught in U.S. Pat. No. 5,476,616. By "shot defect" it is meant small, spherical particles of polymer formed during the web forming process. Table 1 below shows that air permeability of the spunblown sample S-3 was at least 50% higher than the conventional meltblown sample S-2 that was produced at the same condition. The main reason for such an increase is the larger fiber diameter and the wider fiber size distribution that is reflected in the fiber size standard deviation.

TABLE 1

Samples performance of Example 1

| Sample | Fiber Size · μm | Standard Deviation μm | Machine Direction Elongation Percent (%) | Machine Direction Strength gf/gsm/cm | Cross Direction Elongation Percent (%) | Cross Direction Strength gf/gsm/cm | Air Permeability m³/m² · min |
|---|---|---|---|---|---|---|---|
| S-1 | 2.77 | 1.77 | 13.44 | 12.13 | 87.45 | 9.33 | 18.6 |
| S-2 | 1.66 | 0.82 | 17.77 | 10.28 | 24.11 | 9.96 | 11.1 |
| S-3 | 2.23 | 1.57 | 23.84 | 20.24 | 88.94 | 7.54 | 17.4 |

It should be understood that the fibers in the non-woven web 10, 10', 10" or 11 can have a Standard Deviation of from between about 0.9 microns to about 5 microns. Desirably, the fibers in the non-woven web 10, 10', 10" or 11 have a Standard Deviation of from between about 0.92 microns to about 3 microns. More desirably, the fibers in the non-woven web 10, 10', 10" or 11 have a Standard Deviation of from between about 0.95 microns to about 1.6 microns.

Example 2

In this second example, we were comparing a sample produced by the inventive process S-5 to a sample produced by a conventional meltblown process S-4, and to a sample produced by a conventional spunbond process S-6. Three (3) samples were made and each had the same basis weight. As shown in Table 2, the properties of sample S-5 were about half-way between the properties of the conventional meltblown web S-4 and the conventional spunbond web S-6. Table 2 also shows that the air permeability of the sample S-5 (using our inventive process) falls almost half-way between the conventional meltblown sample S-4 and the conventional spunbond sample S-6. This proves that our new technology is capable of producing non-woven webs that have fine fiber diameters, comparable to meltblown fibers, yet still have strong fibers when compared to spunbond fibers.

Figure 10:
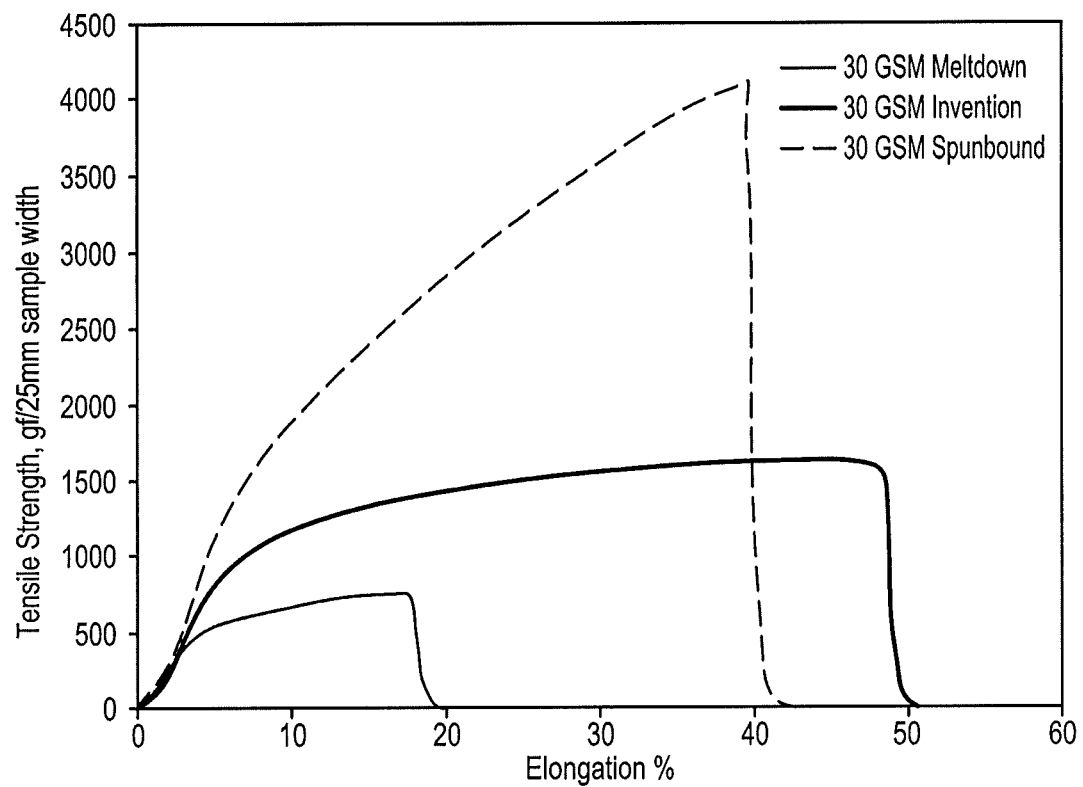
FIG. 10 is a graph comparing machine direction (MD) tensile strength for a conventional meltblown web, a conventional spunbond web and a non-woven Spun-Blown® web.

Referring to FIG. 10, the machine direction (MD) tensile strength of the non-woven web 10, 10', 10" or 11 of this invention (sample S-5) was more than double the machine direction (MD) tensile strength of the meltblown web sample S-4, and almost half the machine direction (MD) tensile strength of the spunbond web sample S-6. Another noticeable feature was that the extensibility of the non-woven web 10, 10', 10" or 11 of this invention (sample S-5) was almost triple the extensibility of the meltblown web sample S-4, and similar to the extensibility of the spunbond web sample S-6.

From the above two examples, it is clear that a non-woven web 10, 10', 10" or 11 made using our inventive apparatus and process is unique and has properties that are about half-way between the properties exhibited by a non-woven web made using a conventional meltblown process, or a non-woven web made using a conventional spunbond process.

Furthermore, the apparatus 34, 34' or 34" of this invention is flexible and versatile enough to use a wide variety of polymeric resins to produce a wide range of non-woven webs. The apparatus 34, 34' or 34" can be operated using meltblown grade resins and well as spunbond grade resins.

TABLE 2

Samples performance of Example 2

| Sample | Fiber Size · μm | Standard Deviation μm | Machine Direction Elongation Percent (%) | Machine direction Strength gf/gsm/cm | Cross Direction Elongation Percent (%) | Cross direction Strength gf/gsm/cm | Air Permeability m³/m² × min |
|---|---|---|---|---|---|---|---|
| S-4 | 2.33 | 1.35 | 15.19 | 10.2 | 33.49 | 16.25 | 7.2 |
| S-5 | 4.39 | 2.98 | 41.02 | 21.24 | 62.86 | 15.96 | 53.7 |
| S-6 | 19.48 | 1.49 | 41.35 | 51.56 | 46.16 | 49.39 | 135.8 |

Apparatus

Referring to FIG. 7, an apparatus 34 is shown for producing a high loft, non-woven web 10, 10', 10" or 11. The apparatus 34 is shown being oriented in a horizontal configuration, although it could be arranged vertically or at some other angle relative to the vertical axis. The high loft, non-woven web 10, 10', 10" or 11 has a 3-dimensional structure with fibers oriented in the x, y and z directions. The apparatus 34 can be connected, attached or secured to an extruder (not shown). Various types and kinds of extruders are well known to those skilled in the art. The apparatus 34 includes a die 36 having from 2 to 20 rows of nozzles 38. Alternatively, two or more dies 36 can be used. Each row contains a plurality of nozzles 38. By 'plurality of nozzles" it is meant at least 3 nozzles. The plurality of nozzles 38 can be arranged in rows and the nozzles 38 in one row can be offset from the nozzles 38 in an adjacent row. Alternatively, the nozzles 38 in one row can be aligned parallel with the nozzles 38 in an adjacent row. Each of the plurality of nozzles 38 emits, ejects or extrudes a filament 40. Each of the plurality of nozzles 38 has a distal end 42. The filament 40 can be formed from a single polymer. The apparatus 34 can use air or gas to facilitate movement and drawing of the molten polymer from the plurality of nozzles 38 into a plurality of filaments 40.

As stated above with reference to the web 10, 10', 10" or 11, the polymer can be polypropylene. Desirably, the polymer is solely polypropylene. More desirably, the polymer is 100% polypropylene.

Figure 8:
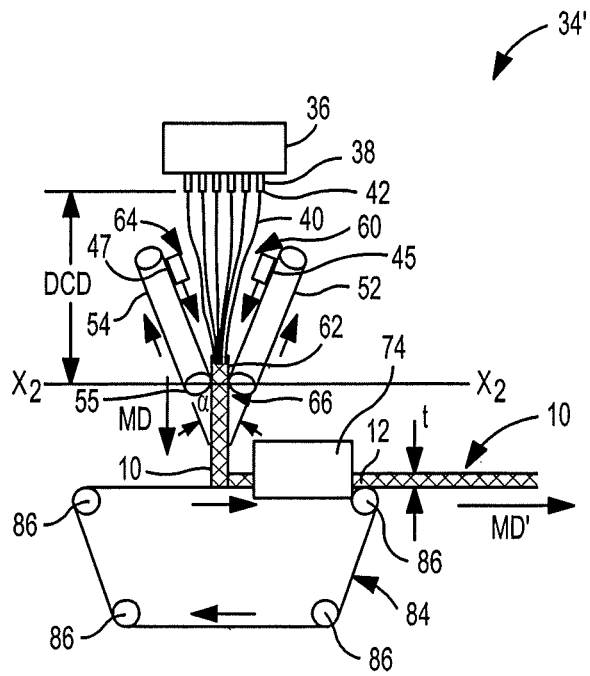
FIG. 8 is a schematic of an alternative apparatus utilizing a pair of angled conveyors located immediately downstream of a die.

A pair of moving surfaces 44 and 46 is located from between about 10 centimeters (cm) to about 150 cm of the distal end 42 of each of the plurality of nozzles 38. The pair of moving surfaces 44 and 46 can be a first rotatable drum 48 and a second rotatable drum 50, as is shown in FIG. 7. Alternatively, the pair of moving surfaces, 44 and 46, can be a first conveyor belt 52 and a second conveyor belt 54, as is shown in FIG. 8. Other forms of moving surfaces, 44 and 46, known to those skilled in the art can also be employed.

When the pair of moving surfaces, 44 and 46, consists of a first rotatable drum 48 and a second rotatable drum 50, the first rotatable drum 48 will have a diameter $d_1$ and the second rotatable drum 50 will have a diameter $d_2$. Desirably, the diameter $d_1$ is approximately equal to the diameter $d_2$. More desirably, the diameters $d_1$ and $d_2$ are identical. The first and second rotatable drums, 48 and 50 respectively, will be aligned parallel to one another on the same plane $X_1$--$X_1$. It should be understood that the apparatus 34 is horizontally oriented so that the filaments 40 will move from left to right in a machine direction (MD) between the first and second rotatable drums, 48 and 50 respectively.

Still referring to FIG. 7, one can see that the first drum 48 rotates counterclockwise while the second drum 50 rotates clockwise. This specific rotation will cause the plurality of continuous filaments 40 to move in the machine direction (MD) away from the plurality of nozzles 38. The speed of the first and second rotatable drums, 48 and 50 respectively, can vary. Desirably, each of the first and second rotatable drums, 48 and 50 respectively, will rotate at the same speed. Alternatively, one of the first and second rotatable drums, 48 and 50 respectively, could rotate at a different speed than the other drum. The speed of the first and second rotatable drums, 48 and 50 respectively, should be adjusted according to the basis weight of the material that is being produced, the thickness of the desired web 10, the kind of polymer being extruded, the polymer throughput through the plurality of nozzles 38, etc.

A unique aspect of this invention is that the pair of moving surfaces 44 and 46 is heated to an elevated temperature by a pair of heaters 45 or 47. A heater 45 is associated with the first rotatable drum 48 or the first conveyor belt 52, and another heater 47 is associated with the second rotatable drum 50 or the second conveyor belt 54. Each of the pair of heaters 45 and 47 can vary in size, construction, shape, etc. The heaters 45 and 47 can vary in design. The heaters 45 and 47 can be infrared heaters, gas heaters, thermal heaters or any other kinds of heaters known to those skilled in the art. By "infrared" it is meant of or relating to the range of invisible radiation wavelengths from about 750 nanometers, just longer than red in the visible spectrum, to 1 millimeter, on the border of the microwave region. The heaters 45 and 47 can be located on either side of the pair of moving surfaces 44 and 46. As shown, the pair of heaters 45 and 47 is located on the outside of the first and second rotatable drums, 48 and 50 respectively. Alternatively, the pair of heaters 45 and 47 could be located within each of the first and second rotatable drums, 48 and 50 respectively. Likewise, the pair of heaters 45 and 47 could be located on either side of the first and second conveyor belts, 52 and 54 respectively. The pair of heaters 45 and 47 should be located within about a foot or less from the pair of moving surfaces 44 and 46. The pair of heaters 45 and 47 can operate at different temperatures but need to be able to heat the pair of moving surfaces 44 and 46 to an elevated temperature. The elevated temperature should be below the melting temperature of the polymer being extruded. The melting temperature of various polymers will differ. The pair of heaters 45 and 47 should warm up the moving surfaces 44 and 46 before the filaments 40 are deposited onto or between the moving surfaces 44 and 46.

The elevated temperature of the pair of moving surfaces 44 and 46 should be less than the melting temperature of the polymer. Polypropylene has a melting temperature in the range of from between about 300° F. to about 340° F. Therefore, the elevated temperature of each of the pair of moving surfaces 44 and 46, for example, the first and second rotatable drums, 48 and 50 respectively, or each of the first and second conveyors belts, 52 and 52 respectively, should be less than the melting temperature of the polymer. The moving surfaces 44 and 46 can be heated to a temperature which is about 10° F. less than the melting temperature of the polymer. Desirably, the moving surfaces 44 and 46 can be heated to a temperature which is about 20° F. less than the melting temperature of the polymer. More desirably, the moving surfaces 44 and 46 can be heated to a temperature which is about 30° F. less than the melting temperature of the polymer. Most desirably, the moving surfaces 44 and 46 can be heated to a temperature which is about 40° F. less than the melting temperature of the polymer.

The elevated temperature of each of the pair of moving surfaces 44 and 46 could range from between about 180° F. to about 300° F. More desirably, the elevated temperature of each of the pair of moving surfaces 44 and 46 could range from between about 180° F. to about 275° F. Even more desirably, the elevated temperature of each of the pair of moving surfaces 44 and 46 could range from between about 180° F. to about 250° F. Still more desirably, the elevated temperature of each of the pair of moving surfaces 44 and 46 could range from between about 180° F. to about 225° F.

The first and second rotatable drums, 48 and 50 respectively, can be hollow cylinders with their outer peripheries covered with a forming wire or screen. The forming wire or screen can be produced from a variety of different materials known to those skilled in the art. For example, the forming wire or screen could be made from a synthetic material, such as polyethylene terephthalate (PET). Alternatively, the forming wire or screen could be made from: metal, steel, aluminum, a plastic, a thermoplastics, etc. The first and second rotatable drums, 48 and 50 respectively, could also be constructed out of various materials, such as steel, cast iron, aluminum, etc. Another option is to cover the outer peripheries of the first and second rotatable drums, 48 and 50 respectively, with metal belts. The metal belts could be ferrous or non-ferrous. The metal belts could contain a plurality of apertures, openings or holes arranged in a predetermined pattern or could be randomly arranged. The size and shape of the apertures, openings or holes can vary. As is known to those skilled in the art, each of the first and second rotatable drums, 48 and 50 respectively, can be equipped with a vacuum chamber, if desired. It is advantageous to heat the outer peripheries of the first and second rotatable drums, 48 and 50 respectively; so that the incoming filaments 40 will more readily form onto them. The reason for this is that the open mesh design of a wire, screen or a metal belt containing apertures, openings or holes can form a specific texture or pattern onto the outer surfaces of the high loft, non-woven web 10, 10', 10" or 11 that is being produced. Such texture or pattern may enhance the sound insulation and/or thermal absorption properties of the finished web 10, 10', 10" or 11. This is an important attribute when the finished high loft, non-woven web 10, 10', 10" or 11 is to be used for sound and/or thermal insulation purposes.

Still referring to FIG. 7, one will notice that each of the first and second rotatable drums, 48 and 50 respectively, has a central axis 56 and 58, respectively. Desirably, each of the central axes 56 and 58 are aligned on a common horizontal plane, designated $X_1$--$X_1$, A vertical distance measured from the distal end 42 of each nozzle 38 perpendicular to the horizontal plane $X_1$--$X_1$ established a Die-to-Collector Distance (DCD). This DCD distance can range from between about 10 cm to about 150 cm. Desirably, the DCD distance is less than about 100 cm. More desirably, the DCD distance is less than about 90 cm. Even more desirably, the DCD distance is less than about 80 cm. Most desirably, the DCD distance is less than about 60 cm. The exact DCD distance is dependent upon a number of factors including but not limited to: the melt temperature of the polymer being extruded the polymer throughput through the plurality of nozzles 38, etc. However, it has been found through experimentation, that the closer the moving surfaces 44 and 46 are located from the distal end 42 of each of the plurality of nozzles 38, the better the recovery value of the manufactured high loft, non-woven web 10, 10', 10" or 11 is after compression. When the DCD distance ranges from between about 20 cm to about 75 cm, a high loft, non-woven web 10, 10', 10" or 11 can be manufactured with a good recovery value after compression.

The outer peripheries of the first and second rotatable drums, 48 and 50 respectively, are spaced apart from one another thereby creating a convergence passage 60. By "convergent passage" it is meant a point of converging, to approach a point. This converging passage 60 narrows down to a dimension equal to a nip 62 established between the first and second rotatable drums, 48 and 50 respectively. The nip 62 can vary in dimension. The first and second rotating drums, 48 and 50 respectively, should be mounted such that the dimension of the nip 62 established therebetween can be easily adjusted. Generally, the nip 62 can range from between about 0.5 cm to about 25 cm. Desirably, the nip 62 is greater than about 0.5 cm. More desirably, the nip 62 ranges from between about 0.5 cm to about 20 cm. Even more desirably, the nip 62 ranges from between about 0.5 cm to about 15 cm. Most desirably, the nip 62 is less than about 12 cm.

The convergent passage 60 has an entry 64 and an exit 66 established by the circumference of the first and second rotatable drums, 48 and 50 respectively. As the plurality of filaments 40 are deposited at the entry 64 of the convergent passage 60 they are directed and routed onto and between the pair of moving surfaces 44 and 46. The routing is facilitated by the rotation of the first and second rotatable drums, 48 and 50 respectively. The routing causes the plurality of filaments 40, which are warm, to pass through the convergent passage 60 in descending travel from the entry 64 to the exit 66. The rotational movement of the first and second rotatable drums, 48 and 50 respectively, will cause some of the plurality of filaments 40 to temporarily contact the outer peripheries of the first and second rotatable drums, 48 and 50 respectively. These filaments 40 will be compressed against the remaining filaments 40 passing through the nip 62 to create a high loft non-woven web 10. It should be understood that the elevated temperature of the molten filaments 40, together with the elevated temperature of the pair of moving surfaces 44 and 46, will cause the filaments 40 which are situated on the major surfaces 28 and 30, see FIGS. 5 and 6, of the web 10, 10', 10" or 11 to fuse together and form outer skins 13 and 15, see FIG. 1. The outer skins 13 and 15 will allow the fibers 12 positioned there between to act as springs and provide the recovery feature to the non-woven web 10, 10', 10" or 11 after it is squeezed or compressed. The non-woven web 10, 10', 10" or 11 exhibits an excellent recovery value because a majority of the fibers 12 located in the middle of the non-woven web 10, 10', 10" or 11 will not be bonded to one another. The non-woven web 10, 10', 10" or 11, which can be formed from a single polymer, such as polypropylene, has this unique recovery characteristic and is similar to webs formed from two or more different fibers, for example, webs which utilize staple fibers and/or crimp fibers along with a second formed fiber. U.S. Pat. No. 7,476,632 B2, issued Jan. 13, 2009, to Olson et al. teaches a "Fibrous Nonwoven Web" having a mass of directly formed fibers disposed within the web in a C-shaped configuration and staple fibers having a crimp of at least 15% randomly and thoroughly dispersed among the directly formed fibers. The staple fibers give the web a lofty and resilient structure. However, up until now, no one has been able to manufacture a non-woven web having excellent recovery values from a single polymer.

Still referring to FIG. 7, the high loft non-woven web 10 is advanced in a machine direction (MD), horizontally to the right. If the apparatus 34 is vertically oriented, gravity can be used to control the direction of advancement. However, if the apparatus 34 is not vertically oriented or if additional support is needed, a conveyor belt 70 can be utilized. The conveyor belt 70 can be constructed with a screen having a porous or open pattern to allow heat to pass therethrough freely. The conveyor belt 70 can move in a given direction over a plurality of rollers 72. Four rollers 72 are depicted in FIG. 7, although any number of rollers 72 can be utilized. One of the rollers 72 is the drive roller and the remaining rollers 72, 72 and 72 are idler or follower rollers. The conveyor belt 70 makes a continuous loop and is illustrated moving in a clockwise direction so as to advance the high loft non-woven web 10 in the machine direction (MD). The conveyor belt 70 is shown being positioned on the left side of the high loft non-woven web 10. However, the conveyor belt 70 could be positioned on the opposite side of the high loft non-woven web 10, if desired. Alternatively, two conveyor belt 70, 70 could be employed, one being positioned on each side of the high loft non-woven web 10.

It should be understood that some high loft, non-woven webs 10 can be formed from certain materials and for certain uses, wherein bonding is not necessary. However, for some high loft, non-woven webs 10, it may be advantageous to subject the high loft non-woven web 10 to an additional bonding process. Additional bonding generally imparts extra strength and integrity into the finished web 10. Various bonding techniques can be utilized. A single bonder or a pair of oppositely aligned bonders can be utilized.

Still referring to FIG. 7, a bonder 74 is shown located downstream of and in vertically alignment with the pair of moving surfaces 44 and 46 for bonding the high loft non-woven web 10. The bonder 74 is located such that the high loft non-woven web 10 passes therethrough. The bonder 74 can be a thermal bonder, such as: a through air bonder or an oven bonder. A thermal bonder can function by creating heat. For example, the heat can be created by a heated fluid, such as gases or liquid, heating a solid, such as coal, heating inert gases, using steam, using secondary radiation from nanoparticles, using infrared heat, etc. The bonder 74 itself can include a furnace, an oven, thermoelectric elements, etc., or any combination thereof. In addition, the bonder 74 can be a chemical bonder, a mechanical bonder, a hydro-mechanical bonder, needle bonder, a wet bonder, etc.

Still referring to FIG. 7, the apparatus 34 may further include one or more dispensing mechanisms 76 and 78 for adding chemical binders, or dispensing one or more additives 80 to the high loft, non-woven web 10. Two dispensing mechanisms 76 and 78 are illustrated in FIG. 7. Chemical bonding system can be utilized instead of the thermal bonding systems. Chemical binders may impart some new features to the web such as different surface chemistry, more stiffness or roughness. The exact number of dispensing mechanisms can vary. Typically, one or two dispensing mechanisms 76 or 78 are utilized to add one or more additives to the high loft, non-woven web 10. The additive 80 can be any of those described above, as well as others known to those skilled in the art.

It should be understood that the high loft, non-woven web 10 could also be partially or fully immersed in a liquid solution containing an additive 80. The liquid solution could be chemically or electrically charged so as to cause the additive 80 to better adhere to the high loft, non-woven web 10.

Still referring to FIG. 7, the apparatus 34 may also include a conditioning unit 82 situated downstream from the last dispensing mechanism 76 or 78. The conditioning unit 82 can vary in design and function. The conditioning unit 82 could be a dryer that can remove moisture from the web 10 by utilizing heat or some other process when the high loft, non-woven web 10 has to be dried. Alternatively, the conditioning unit 82 could be a cooler that could blow cool air onto the high loft, non-woven web 10 and reduce its temperature. Still further, the conditioning unit 82 could perform some other function, for example embossing the web 10, printing the web 10, combining the high loft, non-woven web 10 with another layer, etc. Dryers and coolers are appliances well known to those skilled in the art.

Referring now to FIG. 8, another embodiment of an apparatus 34' is depicted wherein the pair of moving surfaces 44 and 46 is shown as a first conveyor belt 52 and a second conveyor belt 54. The orientation of the apparatus 34' is vertical although other orientations could also be employed. The first conveyor belt 52 moves in a counter-clockwise direction while the second conveyor belt 54 moves in a clockwise direction. This arrangement causes the plurality of filaments 40 emitted, ejected or extruded from the plurality of nozzles 38 to move vertically downward in a machine direction (MD). The first and second conveyor belts, 52 and 54 respectively, can run at various speeds. Desirably, the first and second conveyor belts, 52 and 54 respectively, will run at the same speed.

A pair of heaters 45 and 47 is used to elevate the temperature of the first and second conveyor belts 52 and 54. The heater 45 is associated with and positioned adjacent to the first conveyor belt 52, and the other heater 47 is associated with and positioned adjacent to the second conveyor belt 54. Each of the pair of heaters 45 and 47 can vary in size, construction, shape, etc. The heaters 45 and 47 can vary in design. The heaters 45 and 47 can be infrared heaters, gas heaters, thermal heaters or any other kinds of heaters known to those skilled in the art. By "infrared" it is meant of or relating to the range of invisible radiation wavelengths from about 750 nanometers, just longer than red in the visible spectrum, to 1 millimeter, on the border of the microwave region. The heaters 45 and 47 should be located within about a foot or less from each of the first and second conveyor belts 52 and 54. The heaters 45 and 47 can operate at different temperatures but need to be able to heat the first and second conveyor belts, 52 and 54 respectively, to an elevated temperature which is below the melting temperature of the polymer. Therefore, the elevated temperature of each of the first and second conveyor belts, 52 and 54 respectively, should be less than the melting temperature of the polymer. The first and second conveyor belts, 52 and 54 respectively, can be heated to a temperature which is about 10° F. less than the melting temperature of the polymer. Desirably, the first and second conveyor belts, 52 and 54 respectively, can be heated to a temperature which is about 20° F. less than the melting temperature of the polymer. More desirably, the first and second conveyor belts, 52 and 54 respectively, can be heated to a temperature which is about 30° F. less than the melting temperature of the polymer. Most desirably, the first and second conveyor belts, 52 and 54 respectively, can be heated to a temperature which is about 40° F. less than the melting temperature of the polymer.

The elevated temperature of the first and second conveyor belts, 52 and 54 respectively, should be less than the melting temperature of the polymer. Polypropylene has a melting temperature in the range of from between about 300° F. to about 340° F. Therefore, the elevated temperature of each of the first and second conveyor belts, 52 and 54 respectively, should be less than the melting temperature of the polymer. Desirably, the elevated temperature of each of the first and second conveyor belts, 52 and 54 respectively, should range from between about 180° F. to about 300° F. More desirably, the elevated temperature of each of the first and second conveyor belts, 52 and 54 respectively, should range from between about 180° F. to about 275° F. Even more desirably, the elevated temperature of each of the first and second conveyor belts, 52 and 54 respectively, should range from between about 180° F. to about 250° F. Still more desirably, the elevated temperature of each of the first and second conveyor belts, 52 and 54 respectively, should range from between about 180° F. to about 225° F.

The first and second conveyor belts, 52 and 54 respectively, converge toward one another at a point located farthest away from the distal end 42 of each of said plurality of nozzles 38. An opening 55, equivalent to the nip 62, is present between the first and second conveyor belts 52 and 54 respectively. The opening 55 occurs and is situated at a plane $X_2$--$X_2$. The plane $X_2$--$X_2$ is equivalent to the plane $X_1$--$X_1$, shown in FIG. 7. A vertical distance measured from the distal end 42 of each nozzle 38 perpendicular to the plane $X_2$--$X_2$ established a Die-to-Collector Distance (DCD). This DCD distance can range from between about 10 cm to about 150 cm. Desirably, the DCD distance is less than about 100 cm. More desirably, the DCD distance is less than about 90 cm. Even more desirably, the DCD distance is less than about 80 cm. Most desirably, the DCD distance is less than about 60 cm. The exact DCD distance is dependent upon a number of factors including but not limited to: the melting temperature of the polymer being extruded, the basis weight of the material being produced, the polymer throughput through the plurality of nozzles 38, and the inside diameter of each of the nozzles, etc.

As clearly shown in FIG. 8, the first and second conveyor belts, 52 and 54 respectively, are aligned at an angle alpha ($\alpha$) to one another. The angle $\alpha$ can vary. Desirably, the angle $\alpha$ is less than about 90 degrees. More desirably, the angle $\alpha$ is less than about 60 degrees. Even more desirably, the angle $\alpha$ is less than about 50 degrees. Most desirably, the angle $\alpha$ is less than about 45 degrees. An angle $\alpha$ of from between about 15 degrees to about 45 degrees works well. This orientation creates a convergent passage 60 and a nip 62. The plurality of filaments 40 are deposited at the entry 64 of the convergent passage 60 as they are directed and routed onto and between the first and second heated conveyor belts, 52 and 54 respectively. The routing is facilitates by the movement of the first and second conveyor belts, 52 and 54 respectively. The routing causes the plurality of filaments 40 to pass through the convergent passage 60 in descending travel from the entry 64 to the exit 66. The movement of the first and second conveyor belts, 52 and 54 respectively, will cause some of the plurality of filaments 40 to temporarily contact the outer peripheries of the first and second heated conveyor belts, 52 and 54 respectively. These filaments 40 will be compressed against the remaining filaments 40 passing through the nip 62 to create a high loft non-woven web 10. The plurality of filaments 40 will be compressed at the nip 62 and this confined space helps the filaments 40 to be aligned in the x, y and z directions. Thus a high loft non-woven web 10 is produced.

Still referring to FIG. 8, the apparatus 34' also differs from the apparatus 34, shown in FIG. 7, in that the high loft non-woven web 10 is advanced in a vertical, downward direction until it contacts a conveyor belt 84. The conveyor belt 84 is positioned perpendicular to the downward direction of the high loft non-woven web 10. The conveyor belt 84 moves through a continuous loop in a clockwise direction. The conveyor belt 84 causes the high loft non-woven web 10 to make a 90 degree turn to the right. This new horizontal, rightward movement is referred to as machine direction (MD').

If additional bonding is desired, the high loft non-woven web 10 could be routed past a thermal bonder 74 by a conveyor belt 84. The conveyor belt 84 is mounted on a plurality of rollers 86. Four rollers 86 are depicted in FIG. 8 although any number of rollers 86 can be utilized. One of the rollers 86 is the drive roller and the remaining rollers 86, 86 and 86 are idler or follower rollers.

It should be understood that some high loft, non-woven webs 10 can be formed from certain materials and for certain uses, wherein additional bonding is not necessary.

Process

The process of forming the high loft, non-woven web 10, 10', 10" or 11 will be explained with reference to FIGS. 7-8.

The process includes introducing a molten polymer to a die 36 from an extruder (not depicted). Extruders are well known to those skilled in the art. The die 36 has from 2 to 20 rows of nozzles with each row containing a plurality of nozzles 38. By "plurality of nozzles" it is meant at least 3 nozzles 38. Each nozzle 38 has a distal end 42. The molten polymer can be a single polymer that is emitted through each of the plurality of nozzles 38 to form a plurality of filaments 40. By "emitting" it is meant extruding, ejecting, spinning, forcing or discharging the molten polymer under pressure, in any of the known processes described above and/or known to those skilled in the art.

The process also includes using air or gas streams to facilitate movement and drawing of the plurality of filaments 40. The plurality of filaments 40, which are transformed into a plurality of fibers, are directed towards a pair of heated moving surfaces 44 and 46, located at a distance of from between about 10 cm to about 150 cm from the plurality of nozzles 38. The pair of heated moving surfaces 44 and 46 can be first and second rotatable drums, 48 and 50 respectively, or can be first and second conveyor belts, 52 and 54 respectively. The pair of moving surfaces 44 and 46 can be heated by a pair of heaters 45 and 47, as described above. The pair of heaters 45 and 47 can operate at different temperatures but need to be able to heat the moving surface, 44 and 46 to an elevated temperature. The elevated temperature should be below the melting temperature of the polymer being extruded. The melting temperature of various polymers will differ. The pair of heaters 45 and 47 should warm the moving surfaces 44 and 46 before the fibers are deposited onto or between the moving surfaces 44 and 46. The moving surfaces 44 and 46 can be heated to a temperature which is about 10° F. less than the melting temperature of the polymer. Desirably, the moving surfaces 44 and 46 can be heated to a temperature which is about 20° F. less than the melting temperature of the polymer. More desirably, the moving surfaces 44 and 46 can be heated to a temperature which is about 30° F. less than the melting temperature of the polymer. Most desirably, the moving surfaces 44 and 46 can be heated to a temperature which is about 40° F. less than the melting temperature of the polymer.

The elevated temperature of the first and second heated rotatable drums, 48 and 50 respectively, should be less than the melting temperature of the polymer. Polypropylene has a melting temperature in the range of from between about 300° F. to about 340° F. Therefore, the elevated temperature of each of the first and second heated rotatable drums, 48 and 50 respectively, should be less than the melting temperature of the polymer. Desirably, the elevated temperature of each of the first and second heated rotatable drums, 48 and 50 respectively, should range from between about 180° F. to about 300° F. More desirably, the elevated temperature of each of the first and second heated rotatable drums, 48 and 50 respectively, should range from between about 180° F. to about 275° F. Even more desirably, the elevated temperature of each of the first and second heated rotatable drums, 48 and 50 respectively, should range from between about 180° F. to about 250° F. Still more desirably, the elevated temperature of each of the first and second heated rotatable drums, 48 and 50 respectively, should range from between about 180° F. to about 225° F.

The pair of heated moving surfaces 44 and 46 forms a convergent passage 60 having an entry 64 and an exit 66. The plurality of fibers is deposited into the entry 64 of the convergent passage 60. The plurality of fibers are then routed through the convergent passage 60 in descending travel from the entry 64 to the exit 66 and between the pair of heated moving surfaces 44 and 46 in a machine direction (MD) to form a high loft non-woven web 10. The process can also include additional bonding to the high loft non-woven web 10 to form a web 10, 10', 10" or 11 having a thickness t, $t_1$ or $t_2$ of less than about 250 millimeters and a basis weight ranging from between about 20 g/m² to about 3,000 g/m². The high loft non-woven web 10 can be additionally bonded using a variety of different bonders. Some bonders which can be used include but are not limited to: thermal bonding, oven bonding, chemical bonding, wet bonding, mechanical bonding or hydro-mechanical bonding.

A vertical cross-section of the high loft, non-woven web 10, 10', 10" or 11, when taken parallel to the machine direction (MD), exhibits a plurality of snugly stacked, approximately V, U or C-shaped structures 24 situated between two outer skins 13 and 15 for each layer. Each of the approximately V, U or C-shaped structure 24 has an apex 26 facing in the machine direction (MD). In other words, the approximately V or U shaped structure is rotated 90 degrees to a horizontal orientation with the apex of each facing to the right. The C-shaped structure is reversed in position so that the apex of each faces to the right. The high loft, non-woven web 10, 10', 10" or 11 has a recovery value ranging from between about 20% to about 99% after being compressed under a pressure of 0.25 psi for a time period of 30 minutes. Desirably, the high loft, non-woven web 10, 10', 10" or 11 has a recovery value ranging from between about 30% to about 98% after being compressed under a pressure of 0.25 psi for a time period of 30 minutes. More desirably, the high loft, non-woven web 10, 10', 10" or 11 has a recovery value ranging from between about 40% to about 97% after being compressed under a pressure of 0.25 psi for a time period of 30 minutes.

Referring again to FIGS. 3 and 4, it is possible to utilize two separate and distinct dies 36, 36 to produce a two layered web 10', see FIG. 3. One could also utilize three separate and distinct dies 36, 36 and 36 to produce a three layered web 10", see FIG. 4. Likewise, one could utilize four or more separate and distinct dies, 36, 36, 36 and 36 to produce a multi-layered web having 4 or more layers.

It should be understood that an additive 80 can be added to the high loft, non-woven web 10, 10', 10" or 11 downstream of the convergent passage 60 or downstream of the bonder 74, when the bonder 74 is utilized. The additive 80 can be any of those mentioned above. The additive 80 can be deposited onto the high loft, non-woven web 10, 10', 10" or 11, or it could be sprayed thereon. Alternatively, the high loft, non-woven web 10, 10', 10" or 11 could be immersed in a liquid solution containing an additive 80.

It should also be understood that the high loft, non-woven web 10, 10', 10" or 11 can be dried downstream of the convergent passage 60. Likewise, the high loft, non-woven web 10, 10', 10" or 11 could be cooled downstream of the convergent passage 60 or the bonder 74, when the bonder 74 is utilized. Such cooling could reduce the temperature of the high loft, non-woven web 10, 10', 10" or 11 to room temperature or thereabout.

Experiments:

1. Spun-Blown® Unit

A number of high loft, non-woven webs were produced using a pilot line that had a 15 inch Spun-blown® die with multi-row spinnerettes, known as the Biax Spun-blown® die. This die is commercially available from Biax-Fiberfilm Corporation having an office at N1001 Tower View Drive, Greenville, Wis. 54942. The Spun-blown® spinnerettes had 242 polymer nozzles. The inside diameter of each spinnerette was 0.508 millimeters (mm) while the outside diameter of each spinnerette was 0.711 mm. Each polymer nozzle was surrounded by an air nozzle where the blowing air was coming from the annular space between the polymer nozzle and the air nozzle. The diameter of each of the air nozzles was 1.4 mm. The Biax Spun-Blown® spinnerette is taught in U.S. Pat. Nos. 5,476,616; 9,303,334 B2; and U.S. Patent Publication 2005/0056956 A1. A typical commercial Biax Spun-blown® spinnerette can have from about 6,000 to about 11,000 nozzles per meter.

2. Process Conditions

Several examples of high loft, non-woven webs were made using the Spun-Blown® pilot line to prove the concept of this invention. It should be understood that the exact process conditions used to make these samples could be changed. Any variation of the process conditions, such as air temperature, polymer chemistry or type, polymer melt temperature, air throughput, etc. could be changed. The process and recovery data is shown below in Table 1.

The first two high loft non-woven webs exhibiting excellent recovery (samples 1 and 2) were made of polypropylene that was provided by Lyondel Basell under the trade name: Metocene MF650W. This polypropylene had a typical melt flow rate of 500 grams per 10 minutes (according to ASTM test D 1238, 230° C., 2.16 kg). The next two high loft non-woven webs exhibiting excellent recovery (samples 3 and 4) were made of polypropylene that was provided by Exxon Mobil under the trade name Exxon Mobil™ 3155 Homopolymer. This polypropylene had a typical melt flow rate of 35 grams per 10 minutes (according to ASTM test D 1238, 230° C., 2.16 kg).

The last two high loft non-woven webs exhibiting excellent recovery (samples 5 and 6) were made of polylactic acid that was provided by Natureworks under the trade name: INGEO PLA 6202D. The polylactic acid had a melt flow rate of 15 grams (g) to 30 g per 10 minutes (according to ASTM test D 1238, 210° C., 2.16 kg).

3. Characterization Tests 3.1 Basis Weight

Basis weight is defined as the mass per unit area and it can be measured in grams per meter squared (g/m²). The basis weight test is done according the INDA standard IST 130.1 which is equivalent to the ASTM standard ASTM D3776. Ten (10) different samples were die cut from different locations in a larger sample web and each one had an individual area equal to 100 cm². The weight of each replicate was measured using a sensitive balance within ±0.1% of weight on the balance. The basis weight in grams/m² was measured by multiplying the average weight by 100.

3.2 Thickness of the High Loft Non-Woven

Thickness is defined as the distance between one surface and an opposite surface of a single web measured under a specified pressure. For high loft, non-woven webs, the thickness was measured according the INDA standard IST 120.3 (95). The apparatus includes a thickness testing instrument that had: an anvil, a presser foot, and a scale indicating the distance between these two parallel plates. The foot presser was 305 mm×305 mm (12 inches×12 inches) in size and had a weight of 288 grams. Five representative specimens of the fabric were die cut and tested in the standard atmosphere for testing as prescribed in ASTM D1776. Samples were handled carefully to avoid altering the natural state of the fabric. Each specimen was placed on the bottom plate and the presser foot was placed with care on the top of the sample. The basis weight, the original height (T1), the compressed height (T2), and the final height (T3) of the specimens are reported in Table 1.

3.3 Compression and Recovery of the High Loft Non-Woven Web

In this test, one measures the compression and recovery performance of the high loft, non-woven web samples by observing the linear distance that a movable plane is displaced from a parallel surface by the high loft, non-woven web samples while under a specified pressure. After a specified time interval, the pressure is removed and the recovery of the linear distance is measured. The performance of the high loft, non-woven webs for use in furniture, clothing, and insulation applications (acoustic or thermal) may be estimated from these compression and recovery values. The original thickness T1, measured in millimeters (mm), was measured according to the IST 120.3 (95). The presser foot was raised and the 288 gram weight was replaced with 36 pounds to provide a pressure of 0.25 psi. The presser foot with the new weight was placed on top of the high loft, non-woven webs samples for 30 minutes and then the compressed thickness T2 was measured. Finally, the presser foot was raised and replaced by the 36 pound weight with the 288 gram weight. After five (5) minutes, the presser foot was lowered to measure the thickness recovered, T3.

Percent compression=$[(T1-T2)/T1] \times 100$

Percent Recovery=$[T3/T1] \times 100$

TABLE 1

PROCESS DATA HIGH RECOVERY WEB

| Sample ID | 1 | 2 | 3 | 4 | 5 | 6 |
|---|---|---|---|---|---|---|
| Polymer | PP500 | PP500 | PP35 | PP35 | PLA | PLA |
| Original Height mm T1 | 30.1 | 25.4 | 20.5 | 22.2 | 25.5 | 22.5 |
| Compressed Height mm T2 | 4.7 | 2.4 | 1.8 | 2.8 | 14.1 | 15.0 |
| Final Height mm 13 | 26.9 | 24.1 | 17.4 | 20.6 | 20.5 | 19.1 |
| Recovery Percentage | 89% | 94% | 85% | 93% | 80% | 85% |
| T Polymer Melt ° C. | 220 | 220 | 274 | 278 | 260 | 260 |
| T Air ° C. | 182 | 171 | 260 | 246 | 260 | 260 |
| P Air KPa | 60 | 95 | 100 | 72 | 35 | 35 |
| Basis Weight g/m$^2$ | 200 | 150 | 150 | 200 | 530 | 533 |

PP500 refers to Lyondel Basell MF650W polypropylene having a melt flow of 500 grams/10 minutes @230° C.
PP 35 refers to Exxon Mobil 3155 polypropylene homopolymer having a melt flow of 35 grams/10 minutes @ 230° C.
PLA refers to INGEO PLA 6202D. The polylactic acid had a melt flow rate of 15 grams (g) to 30 g per 10 minutes (according to ASTM test D 1238, 210° C., 2.16 kg).

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A process for forming a high loft, nonwoven web, comprising the steps of:
   introducing a single molten polymer to a die having a plurality of nozzles;
   emitting said single molten polymer through said plurality of nozzles to form a plurality of filaments;
   using air streams to facilitate movement and drawing of said plurality of filaments;
   directing said plurality of filaments, which are transformed into a plurality of fibers, towards a pair of heated moving surfaces located at a distance of from between about 10 cm to about 150 cm from said plurality of nozzles, and said pair of heated moving surfaces forming a convergent passage having an entry and an exit;
   depositing said plurality of fibers into said entry of said convergent passage; and
   routing said plurality of fibers through said convergent passage from said entry to said exit and between said pair of heated moving surfaces in a machine direction to form a high loft, non-woven web having a 3-dimensional structure with said fibers oriented in the x, y and z directions, said web having a fiber size distribution of from 0 μm to about 15 μm with at least about 25% of the fibers being above 4 μm, having a thickness of less than about 250 millimeters and a basis weight ranging from between about 20 g/m2 to about 3,000 g/m$^2$, and a vertical cross-section of said high loft, nonwoven web, when taken parallel to said machine direction, exhibiting a plurality of snugly stacked, approximately V, U or C-shaped structures, with each V, U or C-shaped structure having an apex facing in said machine direction, and said high loft, nonwoven web having a recovery value provided by the single polymer ranging from between about 20% to about 99% after being compressed from an original height value to a compressed height value that is less than about two-thirds of the original height value for a time period of 30 minutes.

2. The process of claim 1 further comprising additionally bonding said non-woven web downstream of said convergent passage using thermal bonding, oven bonding, chemical bonding, wet bonding, mechanical bonding or hydro mechanical bonding.

3. The process of claim 1 wherein the single polymer is polypropylene.

4. The process of claim 1 further comprising adding a superabsorbent downstream of the bonding location.

5. The process of claim 1 further comprising adding a binder.

6. The process of claim 1 further comprising adding a fire retardant.

7. The process of claim 1 further comprising drying said high loft, nonwoven web downstream of said convergent passage.

8. The process of claim 1 wherein said additive is carbon.

9. The process of claim 8 wherein said additive is an abrasive.

10. A process for forming a high loft, nonwoven web, comprising the steps of:
   introducing a single polymer as a single molten polymer to a die having a plurality of nozzles;
   emitting said single molten polymer through said plurality of nozzles to form a plurality of filaments;
   using air streams to facilitate movement and drawing of said plurality of filaments;
   directing said plurality of filaments, which are transformed into a plurality of fibers, towards first and second heated rotatable drums located at a distance of from between about 10 cm to about 150 cm from said plurality of nozzles, and said first and second heated rotatable drums forming a convergent passage having an entry and an exit;
   depositing said plurality of fibers into said entry of said convergent passage; and
   routing said plurality of fibers through said convergent passage from said entry to said exit and between said first and second heated rotatable drums in a machine direction to form a high loft, non-woven web having a 3-dimensional structure with said fibers oriented in the x, y and z directions, said web having a fiber size distribution of from 0 µm to about 8 µm with at least about 25% of the fibers being above 4 µm, having a thickness of less than about 250 millimeters and a basis weight ranging from between about 20 g/m2 to about 3,000 g/m2, and a vertical cross-section of said high loft, nonwoven web, when taken parallel to said machine direction, exhibiting a plurality of snugly stacked, approximately V, U or C-shaped structures, with each V, U or C-shaped structure having an apex facing in said machine direction, and said high loft, nonwoven web having a recovery value provided by the single polymer ranging from between about 30% to about 98% after being compressed from an original height value to a compressed height value that is less than about two-thirds of the original height value under a pressure of 0.25 psi for a time period of 30 minutes.

11. The process of claim 10,
wherein the nonwoven web has a recovery value ranging from between about 80% to about 98% after being compressed under the pressure of 0.25 psi for the time period of 30 minutes.

12. The process of claim 10 further comprising immersing said high loft, nonwoven web in a liquid solution containing an additive.

13. The process of claim 10 further comprising spraying an additive onto said high loft, nonwoven web downstream of said convergent passage.

14. The process of claim 10 further comprising drying said high loft, nonwoven web downstream of said convergent passage.

15. The process of claim 10 further comprising cooling said high loft, nonwoven web downstream of said convergent passage to room temperature.

* * * * *